INVENTORS
CLAUDE L. KENNEDY AND
JAMES S. HARRIS
BY
Charles H. Brown
ATTORNEY

INVENTOR.
CLAUDE L. KENNEDY AND
JAMES S. HARRIS
BY
Charles H. Brown
ATTORNEY

INVENTORS
CLAUDE L. KENNEDY AND
JAMES S. HARRIS
BY
Charles H. Brown
ATTORNEY 2,808,452
Patented Oct. 1, 1957

2,808,452

TELEGRAPH SWITCHING SYSTEM

Claude L. Kennedy, Patchogue, N. Y., and James S. Harris, Old Greenwich, Conn., assignors to Radio Corporation of America, a corporation of Delaware Application November 8, 1955, Serial No. 545,772

12 Claims. (Cl. 178—2)

Figure 1A:
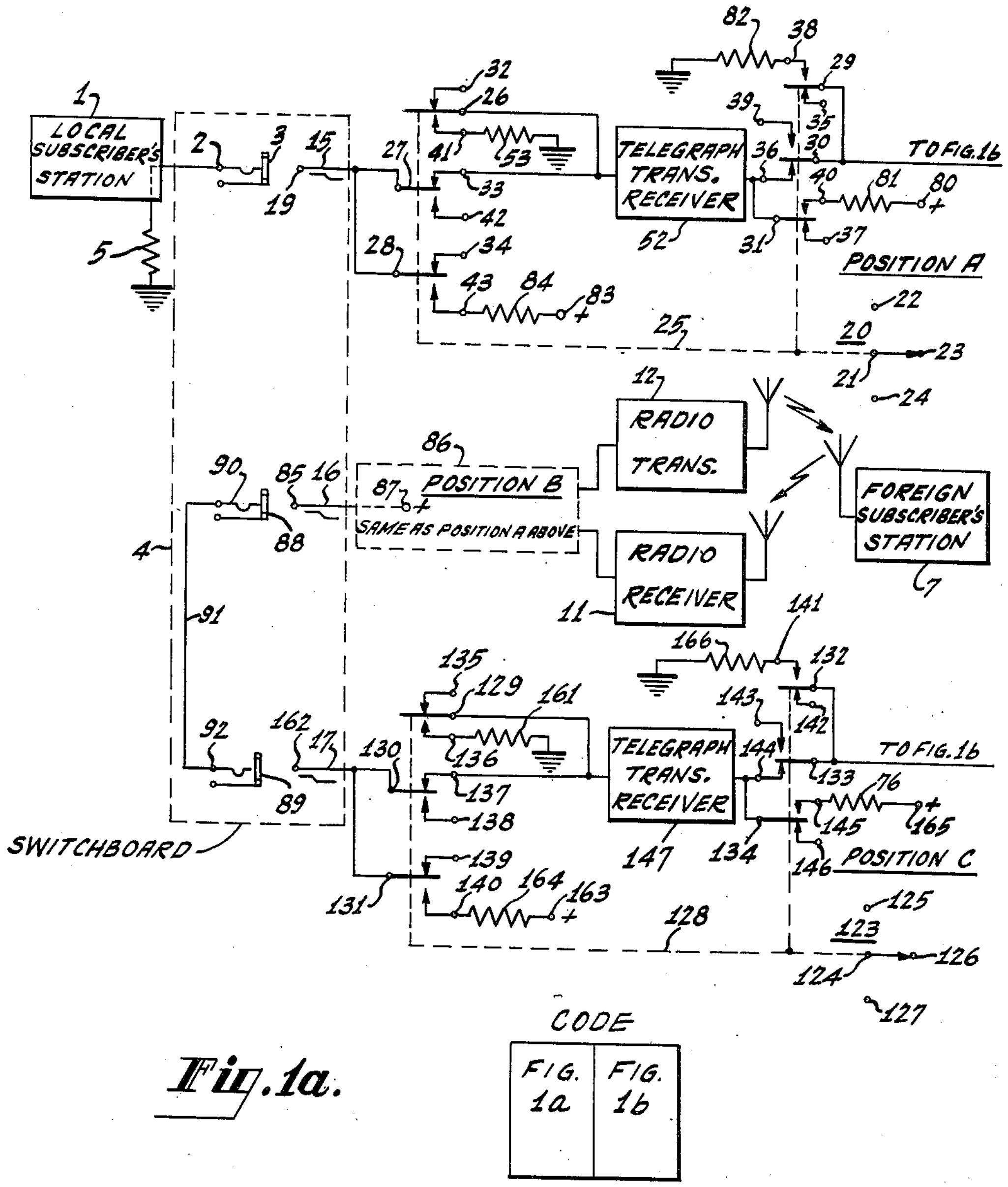

This invention relates to switching systems for use in telegraph circuits. Particularly, the invention concerns a switching system for use at the terminal telegraph station of a telegraph communication system, by means of which connections may be established quickly and efficiently for communication purposes between the subscribers' telegraph stations serviced by the terminal station.

Generally, a telegraph communication system includes a terminal telegraph station, sometimes referred to as a central office, and a plurality of subscribers' telegraph stations which are serviced by the terminal station. A number of the subscribers' stations are operated at different locations which are a considerable distance from the terminal station. Such subscribers' stations are also located a considerable distance from one another and will hereinafter be referred to as foreign stations. The traffic between each of the foreign subscribers' stations and the terminal station can be carried over any of the telegraph transmission systems known in the art. For example, a land line transmission system or a radio frequency transmission system may be used. Other subscribers' stations are located in close proximity to the terminal station, for example, in the same metropolitan area, and will hereinafter be referred to as the local subscribers' stations. Due to the relatively short distances involved, land lines are usually employed to interconnect the respective local subscribers' stations and the terminal station. The traffic received at the terminal station from a particular one of the foreign subscribers' stations may be destined for one of the local subscribers' stations or for a second one of the foreign subscribers' stations serviced by the terminal station. In the first instance, the telegraph circuits at the terminal station are operated to complete a transmission path from the foreign subscriber's station through the terminal station to the desired local subscriber's station, providing a direct connection between the foreign subscriber's station and the local subscriber's station. However, in the case of traffic received from a foreign subscriber's station and destined for a second foreign subscriber's station, because of differences in the termination of the local and foreign subscribers' stations at the terminal station, it has been the practice in communication systems in which complicated switching systems are not practicable to first store the long distant traffic at the terminal station by recording or printing the traffic on a tape or other suitable storage device. The stored traffic is, thereafter, retransmitted by manually or automatically operated equipment at the terminal station to the desired foreign subscriber's station.

The storing of the long distant traffic for retransmission to a foreign subscriber's station necessarily involves the expenditure of time and presents an inconvenience to the subscribers' stations serviced by the terminal telegraph station. The pressure of business often requires prompt communication between foreign subscribers' stations and makes the use of a direct connection between the foreign subscribers' stations, as well as between the foreign subscribers' stations and the local substcribers' stations, most desirable. The retransmission of the long distant traffic at the terminal telegraph station also creates a source of error in that the traffic could be routed to the wrong foreign subscriber's station and erroneous characters could be sent if manually operated telegraph equipment is used. The time spent in correcting such errors by delaying the transmission of the long distant traffic represents a loss of revenue to the communication company serving the foreign subscribers' stations.

It is, therefore, an object of the invention to provide an improved switching system comprising a minimum number of simple components for use at the terminal telegraph station of a telegraph communication system, by means of which connections may be established quickly and efficiently for communication purposes between the different subscribers' telegraph stations serviced by the terminal station.

It is a further object of the invention to provide an improved switching system for use in the terminal telegraph station of a telegraph communication system designed to provide a direct connection for communication purposes between the local subscribers' stations and foreign subscribers' stations serviced by the terminal station, by means of which a direct connection for communication purposes can also be established between any two foreign subscribers' stations serviced by the terminal station.

Briefly, the objects of the invention are accomplished by a novel switching system located at the telegraph terminal station of a telegraph communication system. The telegraph communication system comprises a terminal telegraph station and a plurality of local and foreign subscribers' stations serviced by the terminal station. The local subscribers' stations are connected to a switchboard at the terminal station by separate land lines, each local subscribers' station being connected to a single jack or connecting position on the switchboard. The foreign subscribers' stations are each connected over separate transmission paths to the terminal station. These transmission paths may include the use of a land line or a radio frequency transmission system. The transmission paths are each arranged to terminate in a connecting cord circuit including a plug adapted to be inserted into the jacks on the switchboard. A telegraph transmitter-receiver is connected in each transmission path at the terminal station to record the traffic received from and sent to the respective foreign subscribers' stations through the terminal station. The telegraph transmitter-receiver also enables the operator at the terminal station to communicate with the subscribers' stations serviced by the terminal station.

When a foreign subscriber's station desires to communicate with a local subscriber's station, an operator is so advised by a routing message received at the terminal station by the telegraph transmitter-receiver included in the transmission path interconnecting the terminal station and that foreign subscriber's station. The operator inserts the plug of the connecting cord circuit terminating the particular transmission path into the jack on the switchboard connected to the local subscriber's station with which the foreign subscriber's station desires to communicate. A direct connection between the foreign subscriber's station and the local subscriber's station is obtained. As the current flow through the transmission path at the terminal station is of the proper polarity to produce a corresponding current flow in the operating circuit of the local subscriber's station, an electrical path is provided through the terminal station over which traffic can be carried between the local subscriber's station and the foreign subscriber's station.

According to the invention, a switching system located at the terminal telegraph station comprises an automatically or manually operated control switch in at least one of the transmission paths interconnecting the terminal station and the foreign subscribers' stations. The setting of the switch determines the direction of current flow over the transmission path. When a foreign subscriber's station is connected by means of a transmission path including the switching system of the invention through the terminal telegraph station to a local subscriber's station, the switch is maintained in a normal or standby position. The proper connections are completed to produce a flow of current, and traffic can be carried efficiently and rapidly over the electrical path completed between the local subscriber's station and the foreign subsciber's station. When the foreign subscriber's station desires to communicate with a second foreign subscriber's station, however, the direction of current flow over the transmission path interconnecting the terminal telegraph station and the first foreign subscriber's station is incompatible with the direction of current flow over the transmission path interconnecting the terminal telegraph station and the second foreign subscriber's station for the purpose of communicating between the two foreign subscribers' stations. The direction of current flow over the transmission paths interconnecting the terminal station and the foreign subscribers' stations must be identical to permit the connection of any of the foreign subscribers' stations directly to a local subscriber's station, the local subscribers' stations being arranged to be responsive to current flow in a given direction. Current flow in one of the transmission paths cannot, therefore, produce current flow in the other and, as a result, traffic cannot be carried over a connection made by simply completing a path between the two foreign subscribers' stations at the terminal station.

Assuming that the first foreign subscriber's station is connected to the terminal telegraph station over a transmission path including the switching system of the invention, the plug in the connecting cord circuit terminating that transmission path is inserted into a jack on the switchboard at the terminal station. The jack used is connected tip-to-tip to a second jack on the switchboard by a suitable connecting lead. The plug in the connecting cord circuit terminating the transmission path interconnecting the terminal telegraph station and the second foreign subscriber's station is inserted into the second jack, providing a direct connection between the first and second foreign subscribers' stations through the terminal telegraph station. The switching system of the invention is thereupon manually or automatically operated to alter the direction of current flow in the transmission path interconnecting the terminal telegraph station and the first foreign subscriber's station. The proper electrical connections are completed at the terminal telegraph station in such a manner that current flow in one of the two transmission paths interconnected through the jacks on the switchboard produces current flow in the other. A direct connection in the form of an electrical path is thus established between the first and second foreign subscribers' stations over which traffic can be carried between the two stations through the terminal station. By the use of the switching system of the invention, traffic can be quickly and efficiently handled directly between the foreign and local subscribers' stations or between the foreign subscribers' stations serviced by the terminal station.

Figure 1B:
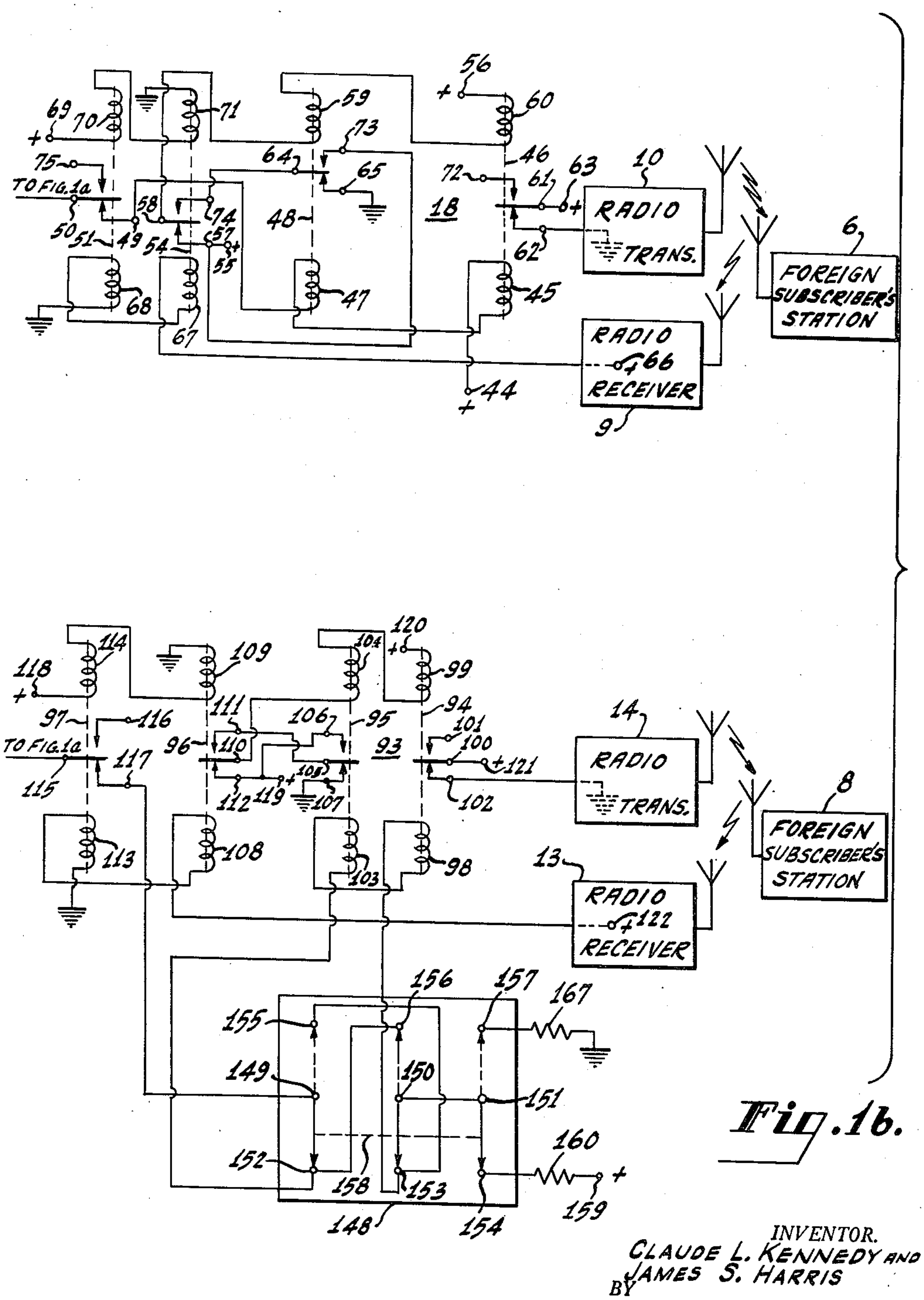
Figure 2:
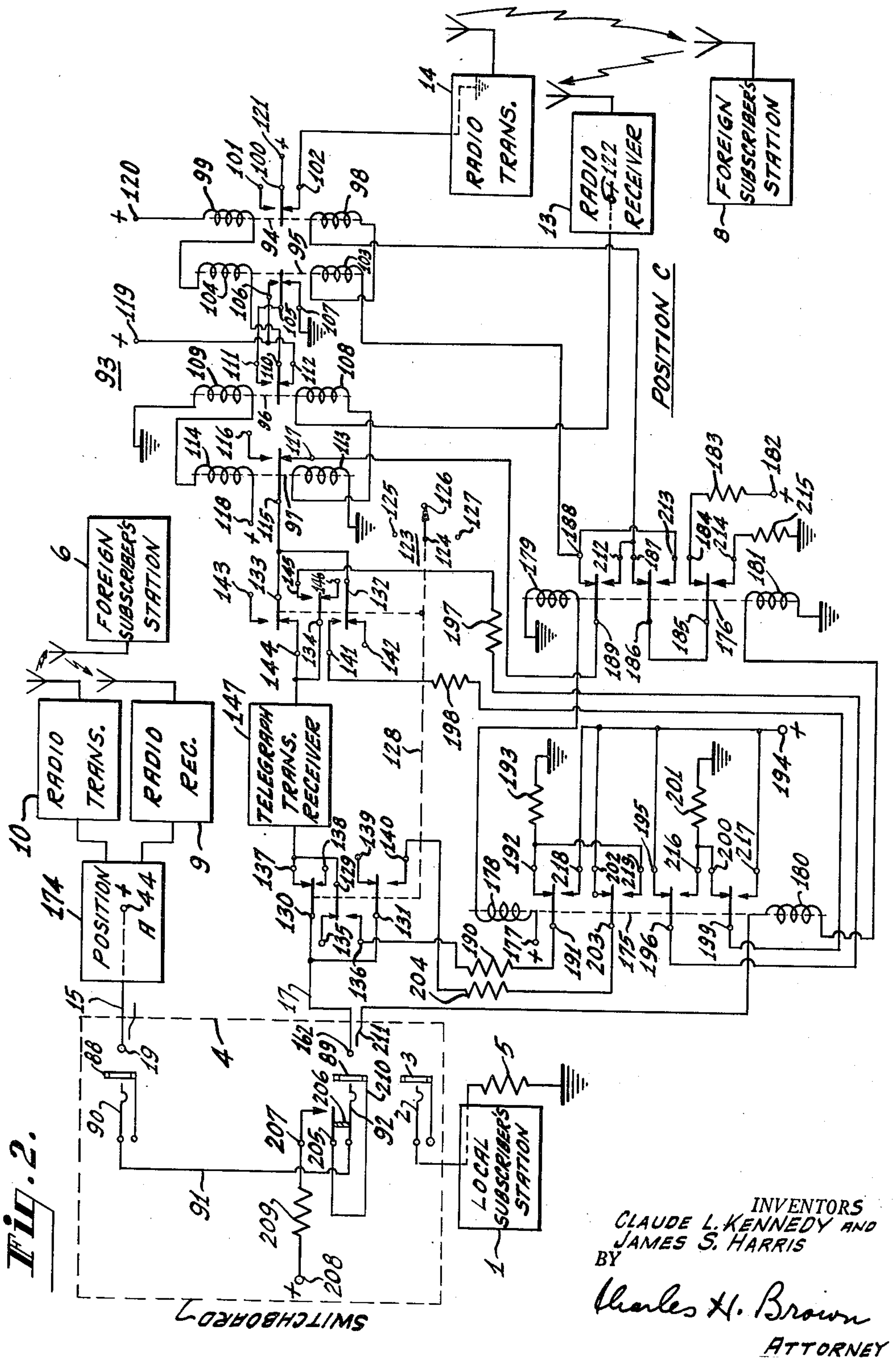

A more complete description of the invention will be given in connection with the accompanying drawing in which:

Figs. 1*a* and 1*b* taken together show one embodiment of a terminal telegraph station including a switching system constructed according to the invention, and Fig. 2 shows a modification of the switching system of the invention shown in Figs. 1*a* and 1*b*.

Referring to Figs. 1*a* and 1*b*, assembled according to the code given in the drawing, there is shown one embodiment of a terminal telegraph station constructed according to the invention. The terminal station is arranged to interconnect a number of telegraph subscribers' stations in a telegraph communication system. A local subscriber's station 1 is connected to the tip 2 of a jack 3 on the switchboard 4 at the terminal station, the tip 2 being connected to ground over a path extending to the local subscriber's station 1 at which is located telegraph transmitting and receiving equipment, not shown, and resistor 5. The term ground, as used in the specification, is to be understood as referring to a point of fixed or zero alternating potential. While only a single local subscriber's station 1 is shown in Figs. 1*a* and 1*b*, it is to be understood that any number of such stations could be connected to separate jacks on the switchboard 4. Each of the local subscribers' stations would be connected to its respective jack in the same manner in which local subscriber's station 1 is connected to jack 3. Three foreign subscribers' stations, represented by blocks 6, 7 and 8, are also included in the telegraph communication system. The foreign subscribers' stations 6, 7 and 8, as well as the local subscriber's station 1, include telegraph transmitting and receiving equipment of conventional design. Such equipment is known in the art and, in itself, forms no part of the invention. Each of the foreign subscribers' stations 6, 7 and 8 is connected by a radio path to the terminal station, and this radio path includes a radio frequency transmission system using a separate radio transmitter and radio receiver located at the terminal station. Foreign subscriber's station 6 is operated to transmit traffic to a radio receiver 9 and to receive traffic from radio transmitter 10. In the same manner, the foreign subscriber's station 7 transmits traffic to a radio receiver 11 and receives traffic from a radio transmitter 12, foreign subscriber's station 8 being operated to transmit traffic to a radio receiver 13 and to receive traffic from a radio transmitter 14. Radio transmitter 10 and radio receiver 9 are connected to a connecting cord circuit 15 over a path including position A of the terminal station. Similarly, radio transmitter 12 and radio receiver 11 are connected to a connecting cord circuit 16 over a path including position B of the terminal station. Radio transmitter 14 and radio receiver 13 are connected to a connecting cord circuit 17 over a path including position C of the terminal station. While radio frequency transmission systems are shown, the positions A, B and C could be connected to the foreign subscribers' stations 6, 7 and 8, respectively, by land line or cable in a manner known in the art.

Position A of the terminal station includes a hybrid circuit 18 to which the radio receiver 9 and radio transmitter 10 are connected. The hybrid circuit 18 operates to electrically separate the traffic transmitted to and received from the foreign subscriber's station 6, preventing the retransmission by radio transmitter 10 of the traffic received by radio receiver 9. Position A also includes a switch 20 which, in turn, includes a control arm 21 and three detents 22, 23 and 24. Control arm 21 is connected by means of a suitable mechanical connection 25 to a plurality of armatures 26, 27, 28, 29, 30 and 31. Each of the armatures 26, 27, 28, 29, 30 and 31 is mounted so as to be movable between two oppositely placed contacts, each armature being arranged to engage a predetermined one of the contacts associated therewith in accordance with the positioning of control arm 21 at one of the detents 22, 23 or 24 of switch 20. When control arm 21 is positioned at detent 23, armature 26 engages contact 32, armature 27 engages contact 33, armature 28 engages contact 34, armature 29 engages contact 35, armature 30 engages contact 36 and armature 31 engages contact 37. By positioning control arm 21 at detent 22 of switch 20, armatures 26, 27 and 28 continue to engage contacts 32, 33 and 34, respectively. The mechanical connection 25, however, causes armature 29 to disengage contact 35 and engage contact 38, armature 30 to disengage contact 36 and engage contact 39 and armature 31 to disengage contact 37 and engage contact 40. On the other hand, when control arm 21 is positioned at detent 24, armatures 29, 30 and 31 continue to engage contacts 35, 36 and 37, respectively. The movement of the control arm 21 to detent 24 and, therefore, that of the mechanical connection 25 causes armature 26 to disengage contact 32 and engage contact 41, armature 27 to disengage contact 33 and engage contact 42 and armature 28 to disengage contact 34 and engage contact 43. By the manual movement of the control arm 21, therefore, the armatures 26, 27, 28, 29, 30 and 31 can be made to engage particular ones of the contacts associated therewith in a predetermined manner.

During periods in which position A of the terminal station is held in standby condition, control arm 21 can be positioned at detent 24 of switch 20. An electrical path is completed from the positive terminal 44 of a source of unidirectional potential, not shown, to ground including the winding 45 of a polar relay 46, the winding 47 of a polar relay 48, contact 49 and armature 50 of polar relay 51, armature 30 and contact 36 of switch 20, telegraph transmitter-receiver 52, armature 26 and contact 41 of switch 20 and resistor 53. A normal idle line current flows over this path from the positive terminal 44 to ground. The current limiting values of the various components in the electrical path may be set to produce, for example, a 60 ma. line current which is conventional in telegraph circuits. It is to be understood that the current limiting values of the circuit components included in positions A, B and C are set so that a similar idle line current is also produced over the various electrical paths to be described hereinafter when the proper connections are made.

The hybrid circuit 18 includes four polar relays 46, 48, 51 and 54. Each of the polar relays 46, 48, 51 and 54 comprises a main winding, a bias winding and an armature arranged to be driven between a pair of oppositely placed contacts in accordance with the operation of the respective polar relays. During periods in which an idle line current is carried over the electrical path completed from the positive terminal 44 to ground, an electrical path is also completed from the positive terminal 55 of a source of unidirectional potential, not shown, to the positive terminal 56 of a second source of unidirectional potential, also not shown, including contact 57 and armature 58 of polar relay 54, bias winding 59 of polar relay 48 and bias winding 60 of polar relay 46. The potential at the positive terminal 56 is lower than that at the positive terminal 55. For example, assuming that a 120 v. positive potential is maintained at the positive terminal 55, a 60 v. positive potential can be maintained at the positive terminal 56. The current limiting values of the components included in the electrical path interconnecting positive terminals 55 and 56 are set to produce a current flow from positive terminal 55 to positive terminal 56 of a value lower than the value of the current flow through the windings 45 and 47 of polar relays 46 and 48, respectively. Assuming that a 60 ma. current is caused to flow through windings 45 and 47, as described above, a 30 ma. current, for example, may be caused to flow through bias windings 59 and 60. As a higher current is caused to flow through winding 45 of polar relay 46 than is caused to flow through the bias winding 60 of the same polar relay, armature 61 engages contact 62 of polar relay 46. An electrical path is completed from the positive terminal 63 of a source of unidirectional potential, not shown, to ground through the telegraph transmitting equipment in the radio transmitter 10 thus producing a flow of idle line current over this path. Because a higher current flows through winding 47 of polar relay 48 than flows through bias winding 59 of the same polar relay, armature 64 engages contact 65 of polar relay 48.

An additional electrical path is completed from the positive terminal 66 of a source of unidirectional potential, not shown, at the radio receiver 9 to ground including winding 67 of polar relay 54 and winding 68 of polar relay 51. An idle line current, for example, a 60 ma. current, flows from the positive terminal 66 to ground through the windings 67 and 68. A biasing current is fed to the polar relays 51 and 54 over an electrical path completed from the positive terminal 69 of a source of unidirectional potential, not shown, to ground including bias winding 70 of polar relay 51 and bias winding 71 of polar relay 54. The biasing current fed to windings 70 and 71 is of a lower value than that of the current fed to windings 67 and 68. For example, a 30 ma. biasing current may be used. As a higher current is caused to flow through winding 67 of polar relay 54 than flows through bias winding 71 of the same polar relay, armature 58 engages contact 57 of polar relay 54, completing the electrical path between the positive terminals 55 and 56, already described. Because a higher current flows through winding 68 of polar relay 51 than flows through bias winding 70 of the same relay, armature 50 engages contact 49 completing the electrical path from the positive terminal 44 to ground, also already described. An idle line current is, therefore, fed to the telegraph transmitter-receiver 52, radio transmitter 10 and radio receiver 9, maintaining the respective components of the telegraph communication system in standby condition.

If an operator at position A of the terminal telegraph station should desire to forward instructions or other traffic to foreign subscriber's station 6, the transmitter of the telegraph transmitter-receiver 52 is operated to transmit the traffic in the form of a telegraph code, for example, a 5-unit telegraph code, over the electrical path completed from positive terminal 44 to ground. A telegraph code of this type is known in the art and includes marking elements or intervals of line current and spacing elements or intervals in which the line current is interrupted. The marking and spacing elements are arranged in a predetermined manner in each character of the traffic so transmitted. As the traffic is transmitted over the electrical path completed from the positive terminal 44 to ground, the windings 45 and 47 of polar relays 46 and 48, respectively, normally energized by the idle line current, are energized and deenergized in accordance with the arrangement of marking and spacing elements in each character included in the traffic. During intervals of line current or the transmission of marking elements, armature 61 engages contact 62 of polar relay 46 and armature 64 engages contact 65 of polar relay 48. During intervals in which the windings 45 and 47 are deenergized by an interruption in the current fed thereto by the transmission of spacing elements, the biasing current fed to windings 59 and 60 of the polar relays 48 and 46, respectively, causes the position of the armature associated with each of the polar relays 46 and 48 to be changed. Armature 61 disengages contact 62 and engages contact 72 of polar relay 46. Armature 64 disengages contact 65 and engages contact 73 of polar relay 48. By the operation of polar relays 46 and 48 in this manner, the current fed from positive terminal 63 to ground through the transmitting equipment at the radio transmitter 10 is keyed in accordance with the traffic transmitted by the telegraph transmitter-receiver 52. The radio transmitter 10 operates in a conventional manner to transmit the traffic so received to foreign subscriber's station 6 over the radio frequency transmission system interconnecting the terminal station and the foreign subscriber's station 6.

When an operator at the foreign subscriber's station 6 desires to communicate with the terminal station, the traffic is transmitted over the radio frequency transmission system interconnecting the foreign subscriber's station 6 and the terminal station and is received by the radio receiver 9. The current fed over the electrical path completed from positive terminal 66 to ground is keyed in accordance with the traffic received by the radio receiver 9. Winding 67 of polar relay 54 and winding 68 of polar relay 51 are energized during the transmission of marking elements or intervals in which curent is fed through the respective windings. Armature 50 engages contact 49 of polar relay 51, and armature 58 engages contact 57 of polar relay 54. During the transmission of spacing elements by interrupting the current carried over the path completed from positive terminal 66 to ground, winding 67 of polar relay 54 and winding 68 of polar relay 51 are deenergized. The biasing current fed to winding 70 of polar relay 51 and winding 71 of polar relay 54 causes a change in the position of the armatures of the respective polar relays 51 and 54. Armature 58 disengages contact 57 and engages contact 74 of polar relay 54, and armature 50 disengages contact 49 and engages contact 75 of polar relay 51. The breaking of the connection between armature 50 and contact 49 opens the electrical path completed from positive terminal 44 to ground, interrupting the current fed thereover. By operating polar relay 51, therefore, in accordance with the traffic received by radio receiver 9, the curent fed over the path completed from positive terminal 44 to ground and including telegraph transmitter-receiver 52 is keyed. The traffic received by radio receiver 9 is fed to the telegraph transmitter-receiver 52 and can be recorded by being printed on a tape or in any manner known in the art.

When the current fed over the path completed from positive terminal 44 to ground is interrupted by the opening of the connection between armature 50 and contact 49 by the operation of polar relay 51, described above, winding 47 of polar relay 48 and winding 45 of polar relay 46 are deenergized. The biasing current fed to winding 59 of polar relay 48 would normally cause armature 64 to disengage contact 65 and engage contact 73 of polar relay 48, while the biasing current fed to winding 60 would normally cause armature 61 to disengage contact 62 and engage contact 72 of polar relay 46. The operation of polar relays 48 and 46 in this manner would cause the traffic received by radio receiver 9 to be fed to radio transmitter 10 which would, in turn, operate to transmit the traffic back to the foreign subscriber's station 6. The transmisson of the traffic back to the foreign subscriber's station 6 is undesirable and would cause garbling in some systems. At the same time that the winding 68 of polar relay 51 is deenergized by the transmission of a spacing element over the electrical path completed from positive terminal 66 to ground, winding 67 of polar relay 54 is also deenergized. The biasing current fed to winding 71 of polar relay 54 causes armature 58 to disengage contact 57 and to engage contact 74 of polar relay 54. It will be remembered that the deenergization of winding 68 of polar relay 51 causes armature 50 to disengage contact 49 of polar relay 51, deenergizing the winding 47 of polar relay 48. The time response of polar relay 54, as compared to that of polar relay 48, is set so that armature 58 is caused to engage contact 74 of polar relay 54 before armature 64 can be made to engage contact 73 of polar relay 48 by the deenergization of winding 47 of polar relay 48. An electrical path is completed from the positive terminal 56 to ground including winding 60 of polar relay 46, winding 59 of polar relay 48, armature 58 and contact 74 of polar relay 54, and armature 64 and contact 65 of polar relay 48. The direction of the flow of biasing current through windings 60 and 59 is reversed. Armature 61 is held in engagement with contact 62 of polar relay 46, and armature 64 is held in engagement with contact 65 of polar relay 48. The hybrid circuit 18 by the operation of the polar relays 46, 48, 51, and 54 in the manner described, therefore, prevents the retransmission of traffic received by radio receiver 9 to the foreign subscriber's station 6 by the operation of radio transmitter 10. The current fed from positive terminal 63 to ground over the path including armature 61 and contact 62 of polar relay 46 and the transmitting equipment at radio transmitter 10 is keyed only by traffic transmitted by the telegraph transmitter-receiver 52 at the terminal station.

An operator at the foreign subscriber's station 6 may wish to communicate with local subscriber's station 1. The operator at the terminal station is so notified by traffic received by the telegraph transmitter-receiver 52. The operator at the terminal station inserts the plug 19 of the connecting cord circuit 15 into the jack 3 on switchboard 4, and positions control arm 21 at detent 23 of switch 20. An electrical path is completed from positive terminal 44 to ground including winding 45 of polar relay 46, winding 47 of polar relay 48, contact 49 and armature 50 of polar relay 51, armature 30 and contact 36 of switch 20, telegraph transmitter-receiver 52, contact 33 and armature 27 of switch 20, plug 19 of connecting cord circuit 15, tip 2 of pack 3, the telegraph transmitting and receiving equipment at local subscriber's station 1 and resistor 5. A direct connection is made between the local subscriber's station 1 and foreign subscriber's station 6 through position A of the terminal station. As the direction of current flow through both position A and the operating circuit of the local subscriber's station 1 is in the proper electrical relationship, current will flow from positive terminal 44 to ground over the path including position A of the terminal station and local subscriber's station 1. The current can be keyed in accordance with traffic transmitted by the local subscriber's station 1, the traffic being transmitted to foreign subscriber's station 6 by the operation of hybrid circuit 18 and the resulting operation of radio transmitter 10. In the same manner, traffic received from the foreign subscriber's station 6 by radio receiver 9 causes the hybrid circuit 18 to operate to key the current fed over the path completed from positive terminal 44 to ground, whereby the traffic received by radio receiver 9 is fed directly to the local subscriber's station 1.

During periods in which the direct connection is completed between the foreign subscriber's station 6 and the local subscriber's station 1, the telegraph transmitter-receiver 52 is normally operated only to record the traffic between the two stations for accounting purposes and so on. However, an operator at position A of the terminal station may wish to break into the connection between the two stations and forward traffic solely to one of the stations. If the operator should wish to communicate only with the local subscriber's station 1, control arm 21 is positioned at detent 22 of the switch 20. An electrical path is completed from the positive terminal 80 of a source of unidirectional potential, not shown, to ground including resistor 81, contact 40 and armature 31 of switch 20, telegraph transmitter-receiver 52, contact 33 and armature 27 of switch 20, plug 19 of connecting cord circuit 15, tip 2 of jack 3, local subscriber's station 1 and resistor 5. A second electrical path is completed from positive terminal 44 to ground including winding 45 of polar relay 46, winding 47 of polar relay 48, contact 49 and armature 50 of polar relay 51, armature 29 and contact 38 of switch 20 and resistor 82. Armature 30 disengages contact 36 and engages contact 39 of switch 20, breaking the connection between the telegraph transmitter-receiver 52 and the hybrid circuit 18. Traffic can be carried over the electrical path completed between the telegraph transmitter-receiver 52 and the local subscriber's station 1 by the keying of the current fed to ground from positive terminal 80. At the same time, an idle line current is fed over the transmission path interconnecting the foreign subscriber's station 6 and the terminal station from positive terminal 44 to ground, the hybrid circuit 18 and, therefore, radio transmitter 10 and radio receiver 9 being maintained in standby condition during the period in which the operator at the terminal station is communicating solely with the local subscriber's station 1.

If the operator at the terminal station desires to communicate solely with the foreign subscriber's station 6, control arm 21 is positioned at detent 24 of switch 20. An electrical path is completed from the positive terminal 83 of a source of unidirectional potential, not shown, to ground including resistor 84, contact 43 and armature 28 of switch 20, plug 19 of connecting cord circuit 15, tip 2 of jack 3, the local subscriber's station 1 and resistor 5. Armature 27 disengages contact 33 and engages contact 42 of switch 20 breaking the connection between the telegraph transmitter-receiver 52 and the local subscriber's station 1. As previously described, a second electrical path is completed from the positive terminal 44 to ground including telegraph transmitter-receiver 52, armature 26 and contact 41 of switch 20 and resistor 53. Traffic can, thereafter, be communicated between the terminal station and the foreign subscriber's station 6 in the manner already described. An idle line current is fed to the local subscriber's station 1 from positive terminal 83, maintaining the local subscriber's station 1 in standby condition. The local subscriber's station 1 and foreign subscriber's station 6 are connected through the terminal station in a manner permitting the rapid and efficient transmission of traffic between the subscriber's stations and, if desired, between the terminal station and each of the subscriber's stations.

The terminal station of the telegarph communication system also includes a second position B. Position B, represented by block 86 for ease of description, is constructed in exactly the same manner as is position A already described. The plug 85 of the connecting cord circuit 16 can be inserted in jack 3 on switchboard 4 to provide a direct connection between local subscriber's station 1 and foreign subscriber's station 7 by means of the radio transmitter 12 and radio receiver 11. The operation of position B is also exactly the same as that of position A. An electrical path is completed from positive terminal 87 of a source of unidirectional potential, not shown, to ground including the plug 85 of connecting cord circuit 16, tip 2 of jack 3, local subscriber's station 1 and resistor 5, the positive terminal 87 corresponding to positive terminal 44 of position A of the terminal station. It is to be understood that position B also includes a hybrid circuit, manually operated switch and telegraph transmitter-receiver similar in construction and operation to the hybrid circuit 18, switch 20 and telegraph transmitter-receiver 52 included in position A. By inserting the plug 19 of connecting cord circuit 15 or the plug 85 of connecting cord circuit 16 into jack 3, either foreign subscriber's station 6 or foreign subscriber's station 7, respectively, can be connected directly to the local subscriber's station 1. In each case, current will flow from the respective positive terminals 44 and 87 in the proper direction to produce a corresponding current flow through the local subscriber's station 1. Traffic can be communicated directly between the local subscriber's station 1 and the foreign subscriber's stations 6 and 7 through the terminal station depending upon which of the plugs 19 or 85 is inserted in the jack 3.

An operator at the foreign subscriber's station 6 may wish to transmit traffic to the foreign subscriber's station 7. A pair of jacks 88 and 89 are provided on the switchboard 4. The tip 90 of jack 88 is connected by lead 91 to tip 92 of jack 89. Plug 19 of connecting cord circuit 15 can be inserted into jack 88, while plug 85 of connecting cord circuit 16 can be inserted into jack 89. A direct connection is made between the foreign subscriber's station 6 and foreign subscriber's station 7 through positions A and B of the terminal station. However, an electrical path is completed from positive terminal 87 at position B to positive terminal 44 at position A. As the terminals 44 and 87 are maintained at the same positive potential, there can be no current flow produced over the connection interconnecting the positions A and B of the terminal station. In order to permit the rapid and efficient connection of the foreign subscribers' stations to the local subscribers' stations, the same direction of current flow must be produced through the respective positions of the terminal station. In this manner any of the foreign subscribers' stations can be connected to a local subscriber's station by the simple insertion of a plug into a jack on the switchboard at the terminal station. As a result, it is not possible by simply interconnecting the two positions A and B through the switchboard 4 to establish a connection over which traffic can be handled directly between foreign subscribers' stations 6 and 7. While the respective foreign subscribers' stations 6 and 7 can be connected directly to the local subscriber's station 1, they cannot be directly connected together to provide an electrical path over which traffic can be carried therebetween. This condition is an inconvenience to the foreign subscribers' stations serviced by the terminal station. Long distant traffic between the foreign subscribers' stations must be received at the terminal station and stored on tape or other recording means. The traffic is, thereafter, retransmitted by the terminal station to the foreign subscriber's station to which the traffic is destined. This handling of the long distant traffic requires the expenditure of time and limits the speed with which the traffic can be transmitted between the foreign subscribers' stations. For example, traffic transmitted from the foreign subscriber's station 6 to foreign subscriber's station 7 must be received by telegraph transmitter-receiver 52 at position A of the terminal station and stored on recording means. The traffic is then retransmitted by the telegraph transmitter-receiver, not shown, at position B to foreign subscriber's station 7. Errors can be made in routing the traffic and in retransmitting the traffic, particularly, if manually operated equipment is used. It is most desirable, therefore, that means be provided whereby a foreign subscriber's station included in a communication system of the type shown can communicate directly not only with a local subscriber's station but also with a second foreign subscriber's stations serviced by the terminal station.

A third position, position C, of the terminal station is shown in Figs. 1*a* and 1*b* and includes a switching system constructed according to the invention. It is to be understood that in actual practice positions A and B of the terminal station would be constructed in the same manner as position C, as will be described in greater detail hereinafter. Position C includes a hybrid circuit 93 which, in turn, includes four polar relays 94, 95, 96 and 97. Polar relay 94 includes a main winding 98, bias winding 99 and an armature 100 mounted so as to be driven between two oppositely placed contacts 101 and 102. Polar relay 95 includes a main winding 103, bias winding 104 and an armature 105 mounted so as to be driven between two oppositely placed contacts 106 and 107. Similarly, polar relay 96 includes a main winding 108, bias winding 109 and an armature 110 mounted so as to be driven between two oppositely placed contacts 111 and 112, polar relay 97 including a main winding 113, bias winding 114 and an armature 115 mounted so as to be driven between two oppositely placed contacts 116 and 117. The operation of hybrid circuit 93 is exactly the same as that of hybrid circuit 18 of position A and a detailed description of the operation of the hybrid circuit 93 need not be repeated. A biasing current is fed through windings 114 and 109 from a positive terminal 118 of a source of unidirectional potential, not shown. An electrical path is completed from the positive terminal 119 of a source of unidirectional potential, not shown, to a second positive terminal 120 of a second source of unidirectional potential, also not shown, the operation of polar relays 94 and 95 being controlled by the biasing circuit so provided in the same manner as are polar relays 46 and 48 of position A. An idle line current is fed from the positive terminal 121 of a source of unidirectional potential, not shown, to ground over a path including armature 100 and contact 102 of polar relay 94 and the transmitting equipment, not shown, at radio transmitter 14. An idle line current is also fed from positive terminal 122 of a source of unidirectional potential to ground including the receiving equipment, not shown, at radio receiver 13, winding 108 of polar relay 96 and winding 113 of polar relay 97. Radio transmitter 14 and radio receiver 13 may be constructed and operated in the same manner as the radio transmitter 10 and radio receiver 9 of position A. However, different forms of transmission may be used, if desired. Radio transmitter 14 and radio receiver 13 may be designed to operate in a frequency modulated radio frequency transmission system, while radio transmitter 10 and radio receiver 9 may be designed to operate in an amplitude modulated radio frequency transmission system. Hybrid circuit 93 operates in exactly the same manner as hybrid circuit 18 of position A to prevent the retransmission by radio transmitter 14 of the traffic received by radio receiver 13.

Position C of the terminal station also includes a manual switch 123 which corresponds in construction and operation to switch 20 at position A. Switch 123 includes a control arm 124 and three detents 125, 126 and 127. The control arm 124 is connected by a mechanical connection 128 to armatures 129, 130, 131, 132, 133 and 134. The movement of control arm 124 between detents 125, 126 and 127 causes the mechanical connection 128 to drive each of the armatures 129, 130, 131, 132, 133 and 134 between two oppositely placed contacts in a predetermined manner. Armature 129 is mounted between contacts 135 and 136, armature 130 between contacts 137 and 138, armature 131 between contacts 139 and 140, armature 132 between contacts 141 and 142, armature 133 between contacts 143 and 144 and armature 134 between contacts 145 and 146. A telegraph transmitter-receiver 147 is included at position C and can be of the same construction and operation as telegraph transmitter-receiver 52 of position A.

Position C of the terminal station, includes a double throw-triple pole switch 148. Switch 148 includes three control arms 149, 150 and 151. A first set of three contacts 152, 153 and 154 is arranged along one side of switch 148, a second set of three contacts 155, 156 and 157 being arranged along the opposite side of switch 148. Control arms 149, 150 and 151 are connected together by a mechanical connection 158 in such a manner that the movement of the connection 158 causes the control arms 149, 150 and 151 to be positioned at one of the two sets of contacts. In one condition of the switch 148, as shown by solid lines, control arm 149 is positioned at contact 152, control arm 150 at contact 153 and control arm 151 at contact 154. In the second condition of switch 148, as shown by dotted lines, control arm 149 is positioned at contact 155, control arm 150 at contact 156 and control arm 151 at contact 157. By operating the control arms 149, 150 and 151 simultaneously by the mechanical connection 158, each of the control arms 149, 150 and 151 is positioned at the desired contact of switch 148 by a single movement of the connection 158.

In standby condition control arm 124 can be positioned at detent 127 of switch 123, and the mechanical connection 158 is operated to position control arm 149 at contact 152, control arm 150 at contact 153 and control arm 151 at contact 154. An electrical path is completed from the positive terminal 159 of a source of unidirectional potential, not shown, to ground including resistor 160, contact 154 and control arm 151 of switch 148, control arm 150 and contact 153 of switch 148, winding 98 of polar relay 94, winding 103 of polar relay 95, contact 152 and control arm 149 of switch 148, contact 117 and armature 115 of polar relay 97, armature 133 and contact 144 of switch 123, telegraph transmitter-receiver 147, armature 129 and contact 136 of switch 123 and resistor 161. An idle line current is fed over the path maintaining the telegraph transmitter-receiver 147 in standby condition. Winding 98 of polar relay is energized causing armature 100 to engage contact 102 of the polar relay 94. An idle line current is fed to radio transmitter 14 from positive terminal 121, maintaining radio transmitter 14 in standby condition. Traffic can be transmitted between position C of the terminal station and the foreign subscriber's station 8 in the manner described in connection with position A of the terminal station.

If an operator at the foreign subscriber's station 8 desires to communicate directly with local subscriber's station 1, plug 162 of connecting cord circuit 17 is inserted into jack 3 on the switchboard 4, and control arm 124 is positioned at detent 126 of switch 123. Switch 148 is left in the standby condition. An electrical path is completed from positive terminal 159 to ground including resistor 160, contact 154 and control arm 151 of switch 148, control arm 150 and contact 153 of switch 148, winding 98 of polar relay 94, winding 103 of polar relay 95, contact 152 and control arm 149 of switch 148, contact 117 and armature 115 of polar relay 97, armature 133 and contact 144 of switch 123, telegraph transmitter-receiver 147, contact 137 and armature 130 of switch 123, plug 162 of connecting cord circuit 17, tip 2 of jack 3, local subscriber's station 1 and resistor 5. A direct connection is provided between the local subscriber's station 1 and the foreign subscriber's station 8 through position C of the terminal station. The proper direction of current flow is produced through both position C of the terminal station and the local subscriber's station 1 to permit the passage of traffic through the terminal station between the local subscriber's station 1 and the foreign subscriber's station 8. The hybrid circuit 93 controls the operation of radio transmitter 14 to forward the traffic transmitted by the local subscribers station 1 to foreign subscriber's station 8 over the radio frequency transmission system interconnecting the terminal station and foreign subscriber's station 8. The hybrid circuit 93 also operates to forward to the local subscriber's station 1 the traffic transmitted by the foreign subscriber's station 8 and received by the radio receiver 13. By positioning control arm 124 at either detent 125 or detent 127 of switch 123, an operator at position C of the terminal station can communicate solely with either the local subscriber's station 1, or foreign subscriber's station 8, respectively. The operation of position C to provide a direct connection through the terminal station between local subscriber's station 1 and foreign subscriber's station 8 is exactly the same as the operation of position A to provide a direct connection between local subscriber's station 1 and foreign subscriber's station 6, previously described.

Instead of communicating directly with the local subscriber's station 1, the operator at the foreign subscriber's station 8 may wish to communicate directly, for example, with foreign subscriber's station 6. The operator at position C of the terminal station operates the mechanical connection 158 to change the condition of switch 148. Control arm 149 is placed at contract 155, control arm 150 at contact 156 and control arm 151 at contact 157. Plug 162 of connecting cord circuit 17 is inserted into jack 89, and plug 19 of connecting cord circuit 15 is inserted into jack 88. Control arm 21 is positioned at detent 23 of switch 20, and control arm 124 is positioned at detent 126 of switch 123. An electrical path is completed from positive terminal 44 at position A to ground including hybrid circuit 18, telegraph transmitter-receiver 52, plug 19 of connecting cord circuit 15, tip 90 of jack 88, lead 91, tip 92 of jack 89, plug 162 of connecting cord circuit 17, telegraph transmitter-receiver 147, control arm 149 and contact 155 of switch 148, contact 153 of switch 148, winding 98 of polar relay 94, winding 103 of polar relay 95, contact 152 of switch 148, contact 156 and control arm 150 of switch 148, control arm 151 and contact 157 of switch 148 and resistor 167. By the operation of the switch 148 at position C of the terminal station, the direction of the current flow through position C is reversed. However, it is to be noted that the winding 98 of polar relay 94 and winding 103 of polar relay 95 are connected to the contacts of switch 148 in such a manner that current is fed through the respective windings in the same direction for both conditions of the switch 148. The operation of the polar relays 94 and 95 and, therefore, that of hybrid circuit 93 is not altered by the change in the condition of the switch 148.

By reversing the direction of the current flow through position C, an electrical path is established including hybrid circuits 18 and 93 over which current can be fed from positive terminal 44 at position A to a ground connection at position C. Traffic transmitted by foreign subscriber's station 8 is received by radio receiver 13 and forwarded by the operation of hybrid circuit 93 at position C to the hybrid circuit 18 at position A. Hybrid circuit 18 controls the operation of radio transmitter 10 to transmit the traffic of foreign subscriber's station 6. In the same manner, traffic transmitted by foreign subscriber's station 6 is received by radio receiver 9 and forwarded by the operation of hybrid circuit 18 at position A to hybrid circuit 93 at position C. Hybrid circuit 93 controls the operation of radio transmitter 14 to transmit the traffic to foreign subscriber's station 8. As it is not necessary to record the traffic at both positions A and C, the telegraph transmitter-receiver included at one of the positions, for example, telegraph transmitter-receiver 147, can be disconnected, the traffic being recorded by the telegraph transmitter-receiver 52 at position A. A direct connection is provided by means of which traffic can be rapidly and efficiently forwarded between the foreign subscribers' stations 6 and 8. In the embodiment shown in Figs. 1*a* and 1*b*, such a connection can also be established between foreign subscribers' stations 7 and 8. In this case, an electrical path is completed from positive terminal 87 at position B to the ground connection at position C, switch 148 at position C being operated as described above to establish an electrical path over which traffic can be carried between the two foreign subscribers' stations 7 and 8. As mentioned previously, in actual practice positions A and B of the terminal station are each arranged to include the switching system of the invention as shown at position C to permit a direct connection to be made between any two foreign subscribers' stations serviced by the terminal station. By reversing the direction of the flow of current through the position at the terminal station which is included in the transmission path interconnecting the terminal station and a foreign subscriber's station, a direct connection can be established between that foreign subscriber's station and any other foreign subscriber's station serviced by the terminal station. An electrical path is completed over which traffic can be rapidly and efficiently carried between the two foreign subscribers' stations. A switching system is, therefore, provided for use in the terminal station of a telegraph communication system, permitting the direct transmission of traffic between a foreign subscriber's station and any other subscriber's station serviced by the terminal station. By the use of the switching system of the invention, a foreign subscriber's station can be connected directly to a local subscriber's station or to a second foreign subscriber's station through the terminal station of the telegraph communication system.

As previously described, each position A, B and C of the terminal station includes a switch by the operation of which an operator at the terminal station can selectively communicate with either one of two subscribers' stations connected together through the terminal station. By placing the switch in one condition, the operator can communicate with a predetermined one of the subscribers' stations. By placing the switch in a second condition, the operator can communicate with the other or second subscriber's station. Assuming that a direct connection is established between foreign subscribers' stations 6 and 8, an operator at position A of the terminal station can by positioning control arm 21 at detent 24 of switch 20 operate telegraph transmitter-receiver 52 to transmit traffic only to foreign subscriber's station 6. By positioning control arm 21 at detent 22 of switch 20 the telegraph transmitter-receiver 52 can be operated to transmit traffic only to foreign subscriber's station 8. The operation of the various armatures 26, 27, 28, 29, 30 and 31 of switch 20 is exactly the same as though the foreign subscriber's station 6 were connected through the terminal station to local subscriber's station 1. The proper electrical paths are established at each position of the control arm 21 of switch 20 to permit the selective transmission of traffic between position A of the terminal station and the respective foreign subscribers' stations 6 and 8.

Although switch 123 at position C is also included in the connection between the two foreign subscribers' stations 6 and 8, it cannot be operated to achieve the same result. It will be remembered that switch 148 at position C is operated to change the direction of the flow of current through position C when a direct connection is established between the foreign subscriber's station 8 and a second foreign subscriber's station serviced by the terminal station, for example, foreign subscriber's station 6. If control arm 124 is positioned at detent 127 of switch 123, one side of telegraph transmitter-receiver 147 is connected to ground over a path including contact 144 and armature 133 of switch 123, armature 115 and contact 117 of polar relay 97, switch 148 and resistor 167. The other side of telegraph transmitter-receiver 147 is also connected to ground over a path including armature 129 and contact 136 of switch 123 and resistor 161. As both sides of the telegraph transmitter-receiver 147 are at ground potential, it is inoperative. Further, one end of the electrical path through position A and switchboard 4 is connected to positive terminal 44 at position A, the other end being connected to the positive terminal 163 of a source of unidirectional potential, not shown, over a path including armature 131 and contact 140 of switch 123 and resistor 164. Both ends of the path are placed at the same positive potential, removing the flow of idle line current through position A and making the telegraph transmitter-receiver 52, as well as the hybrid circuit 18, inoperative. On the other hand, if control arm 124 is positioned at detent 125 of switch 123, one side of telegraph transmitter-receiver 147 is connected to the positive terminal 165 of a source of unidirectional potential, not shown, over a path including armature 134 and contact 145 of switch 123 and resistor 76. The other side of telegraph transmitter-receiver 147 is connected to the positive terminal 44 at position A of the terminal station. Both sides of the telegraph transmitter-receiver 147 are now at the same positive potential, and the telegraph transmitter-receiver 147 is again inoperative. One side of the hybrid circuit 93 is connected to ground over a path including switch 148 and resistor 167, the other side also being connected to ground over a path including armature 132 and contact 141 of switch 123 and resistor 166. As both sides of hybrid circuit 93 are at ground potential, the hybrid circuit 93 is also inoperative. The switch 20 at position A can be used to provide the necessary connections between the terminal station and the foreign subscribers' stations 6 and 8. However, the operation of switch 123, while not essential to the satisfactory operation of the terminal station of the telegraph communication system in the manner described, does place a limitation on the operation of position C at the terminal station.

Referring to Fig. 2, there is shown a modification of the switching system of the invention shown in Figs. 1*a* and 1*b*. The switching system of position C is modified not only to permit the proper operation of the switch 123 but also to bring about the automatic operation of the switching system when a connection is established for communication purposes between the foreign subscriber's station 8 and a second foreign subscriber's station serviced by the terminal station. Although the switching system of position C of the terminal station is modified, the overall operation and construction of the terminal station remains the same. For ease of description, the circuit components in Fig. 2 which are the same as the circuit components in Figs. 1*a* and 1*b* have been identified by the same numerical designation. Instead of a manually operated switch 148, as shown in Fig. 1*b*, position C is arranged to include two polar relays 175 and 176. In standby condition, a biasing current is fed from the positive terminal 177 of a source of unidirectional potential, not shown, to ground over a path including winding 178 of polar relay 175 and winding 179 of polar relay 176. In actual practice, polar relays 175 and 176 may be neutral relays, eliminating the need for biasing windings 178 and 179, respectively. A second winding 180 of polar relay 175 and a second winding 181 of polar relay 176 are deenergized. The biasing current of a value, for example, of 30 ma. fed through windings 178 and 179 operates polar relays 175 and 176, respectively, to hold the armatures of the two polar relays 175 and 176 in the positions shown in Fig. 2. A connection is completed between the terminal station and foreign subscriber's station 8 by positioning control arm 124 at detent 127 of switch 123. An electrical path is completed from the positive terminal 182 of a source of unidirectional potential, not shown, to ground including resistor 183, contact 184 and armature 185 of polar relay 176, armature 186 and contact 187 of polar relay 176, winding 98 of polar relay 94, winding 103 of polar relay 95, contact 188 and armature 189 of polar relay 176, contact 117 and armature 115 of polar relay 97, armature 133 and contact 144 of switch 123, telegraph transmitter-receiver 147, armature 129 and contact 136 of switch 123, resistor 190, armature 191 and contact 192 of polar relay 175 and resistor 193. An idle line current will flow from the positive terminal 182 to ground through the hybrid circuit 93 and the telegraph transmitter-receiver 147. Traffic can be communicated between the terminal station and the foreign subscriber's station 8 over the radio frequency transmission system interconnecting the two stations and including radio transmitter 14 and radio receiver 13.

When an operator at the foreign subscriber's station 8 desires to communicate directly with the local subscriber's station 1 through the terminal station, an operator at position C of the terminal station inserts plug 162 of the connecting cord circuit 17 in jack 3 on switchboard 4. Control arm 124 is positioned at detent 126 of switch 123, and an electrical path is completed from positive terminal 182 to ground including position C of the terminal station and the local subscriber's station 1. The electrical path through position C, instead of being connected at one end to ground through armature 191 and contact 192 of polar relay 175, is now connected to ground through the local subscriber's station 1. Traffic can be communicated directly between local subscriber's station 1 and foreign subscriber's station 8 through position C of the terminal station. An operator at position C of the terminal station can break the direct connection between the local subscriber's station 1 and the foreign subscriber's station 8 by the operation of switch 123. By positioning control arm 124 at detent 125 of switch 123, an operator at the terminal station can operate the telegraph transmitter-receiver 147 to transmit traffic only to the local subscriber's station 1. An electrical path is completed from the positive terminal 194 of a source of unidirectional potential, not shown, to ground including contact 195 and armature 196 of polar relay 175, resistor 197, contact 145 and armature 134 of switch 123, telegraph transmitter-receiver 147 and local subscriber's station 1. Traffic can be communicated between the terminal station and local subscriber's station 1 over the electrical path so completed. An idle line current is fed from positive terminal 182 to ground over an electrical path including hybrid circuit 93, armature 132 and contact 141 of switch 123, resistor 198, armature 199 and contact 200 of polar relay 175 and resistor 201, the hybrid circuit 93 being maintained in standby condition. By positioning control arm 124 at detent 127 of switch 123, the operator can operate the telegraph transmitter-receiver 147 to transmit traffic only to the foreign subscriber's station 8. An electrical path is completed from the positive terminal 194 to ground including contact 202 and armature 203 of polar relay 175, resistor 204, contact 140 and armature 131 of switch 123 and local subscriber's station 1. An idle line current is fed from positive terminal 194 to ground over the path, maintaining the local subscriber's station 1 in standby condition. A second electrical path is completed from positive terminal 182 to ground including hybrid circuit 93, telegraph transmitter-receiver 147, armature 129 and contact 136 of switch 123, resistor 190, armature 191 and contact 192 of polar relay 175 and resistor 193. As previously described, a connection is completed over which traffic can be carried between the terminal station and foreign subscriber's station 8. In each condition of the switch 123, the proper electrical connections are provided through the armatures and contacts of polar relay 175 to complete the desired electrical paths between the terminal station and the subscribers' stations. The operation of position C including the operation of switch 123 to provide connections for communication purposes between the local subscriber's station 1 and foreign subscriber's station 8 has been described in greater detail in connection with Figs. 1*a* and 1*b*.

When the foreign subscriber's station 8 is to be connected directly to a second foreign subscriber's station serviced by the terminal station, plug 162 of the connecting cord circuit 17 is inserted into jack 89 on switchboard 4. Position A of the terminal station is shown in Fig. 2 as block 174. It will be assumed that a direct connection is to be established between foreign subscriber's station 8 and foreign subscriber's station 6 through the terminal station. Plug 19 of connecting cord circuit 15 is inserted into jack 88 on switchboard 4. When the plug 162 is inserted into jack 89, the tip 92 is moved in an upward direction. Jack 89 is modified so that the tip 92 is connected to an armature 205 by means of a bar 206 constructed of insulating material. The movement of tip 92 and, therefore, the corresponding movement of the bar 206, causes the armature 205 to engage a contact 207 of the jack 89. An electrical path is completed from the positive terminal 208 of a source of unidirectional potential, not shown, to ground including resistor 209, contact 207 and armature 205 of jack 89, ring 210 of jack 89, sleeve 211 of the plug 162 included in the connecting cord circuit 17, the winding 180 of polar relay 175 and the winding 181 of polar relay 176. Jack 89 on switchboard 4, therefore, is modified to include means for completing an energizing circuit for the windings 180 and 181 of polar relays 175 and 176, respectively. The current fed through the windings 180 and 181 is of a value, for example, 60 ma., which is greater than the value of the current fed through windings 178 and 179. The resulting operation of polar relays 175 and 176 causes the armatures thereof to change position. An electrical path is completed from the positive terminal 44 at position A of the terminal station to ground including plug 19 of connecting cord circuit 15, tip 90 of jack 88, lead 91, tip 92 of jack 89, plug 162 of connecting cord circuit 17, armature 130 and contact 137 of switch 123, telegraph transmitter-receiver 147, contact 144 and armature 133 of switch 123, armature 115 and contact 117 of polar relay 97, armature 189 and contact 212 of polar relay 176, winding 98 of polar relay 94, winding 103 of polar relay 95, contact 188 of polar relay 176, contact 213 and armature 186 of polar relay 176, armature 185 and contact 214 of polar relay 176, and resistor 215. Current is fed from positive terminal 44 to ground over the electrical path completed through position A and position C of the terminal station. A direct connection is provided between the foreign subscriber's station 6 and the foreign subscriber's station 8 over which traffic can be carried through the terminal station.

When control arm 124 is positioned at detent 125 of switch 123, an electrical path is completed from the positive terminal 44 at position A of the terminal station to ground including jacks 88 and 89 on switchboard 4, armature 130 and contact 137 of switch 123, telegraph transmitter-receiver 147, armature 134 and contact 145 of switch 123, resistor 197, armature 196 and contact 216 of polar relay 175 and resistor 201. A second electrical path is completed from positive terminal 194 to ground including contact 217 and armature 199 of polar relay 175, resistor 198, contact 141 and armature 132 of switch 123, armature 115 and contact 117 of polar relay 97, armature 189 and contact 212 of polar relay 176, winding 98 of polar relay 94, winding 103 of polar relay 95, contact 188 of polar relay 176, contact 213 and armature 186 of polar relay 176, armature 185 and contact 214 of polar relay 176 and resistor 215. Current is fed from positive terminal 44 to ground through position A of the terminal station and the telegraph transmitter-receiver 147 at position C of the terminal station, and traffic can be communicated between the terminal station and foreign subscriber's station 6. An idle line current is fed from positive terminal 194 to ground through the hybrid circuit 93, maintaining the hybrid circuit 93 in standby condition. Therefore, by positioning control arm 124 at detent 125 of switch 123, an operator at the terminal station can break into the connection between the foreign subscriber's station 6 and foreign subscriber's station 8 and transmit traffic only to the foreign subscriber's station 6.

When an operator at the terminal station wishes to break into the connection between the foreign subscribers' stations 6 and 8 and transmit traffic only to foreign subscriber's station 8, control arm 124 is positioned at detent 127 of switch 123. An electrical path is completed from positive terminal 194 to ground including contact 218 and armature 191 of polar relay 175, resistor 190, contact 136 and armature 129 of switch 123, telegraph transmitter-receiver 147, contact 144 and armature 133 of switch 123, armature 115 and contact 117 of polar relay 97, armature 189 and contact 212 of polar relay 176, winding 98 of polar relay 94, winding 103 of polar relay 95, contact 188 of polar relay 176, contact 213 and armature 186 of polar relay 176, armature 185 and contact 214 of polar relay 176 and resistor 215. A second electrical path is completed from positive terminal 44 at position A to ground including jacks 88 and 89 on switchboard 4, armature 131 and contact 140 of switch 123, resistor 204, armature 203 and contact 219 of polar relay 175 and resistor 193. Current is fed from positive terminal 194 to ground through the telegraph transmitter-receiver 147 and the hybrid circuit 93. Traffic can be communicated by the operation of the telegraph transmitter-receiver 147 over the connection completed between position C of the terminal station and the foreign subscriber's station 8. An idle line current is fed from positive terminal 44 to ground through position A of the terminal station, maintaining position A in standby condition. The operation of polar relays 175 and 176, therefore, provides the proper connections to permit not only a direct connection to be automatically completed between foreign subscribers' stations 6 and 8 but also permits the use of switch 123 at position C. An operator at position C can by the use of switch 123 selectively transmit traffic to either foreign subscriber's station 6 or foreign subscriber's station 8 by breaking into the connection completed between the two stations.

As previously mentioned, in actual practice the positions at the terminal station are arranged to include the same switching system. If the modified switching system of the invention shown in Fig. 2 is used, such a switching system is included in each position. Each position can be operated as described in connection with position C shown in Fig. 2 to complete a direct connection for communication purposes between a foreign subscriber's station and a local subscriber's station. In completing a direct connection for communication purposes between two foreign subscribers' stations, it is merely necessary to connect one of the foreign subscriber's stations through a position of the terminal station to jack 88 on the switchboard 4. The second foreign subscriber's station is connected through a different position of the terminal station to jack 89. It will be remembered that jack 89 is modified to include means for controlling the operation of the switching system included in a position connected thereto, while jack 88 is not. The switching system of the invention included in the position connected to jack 89 is, therefore, automatically operated by the control means at jack 89 to reverse the direction of the current flow through that position of the terminal station. As the direction of current flow through the position connected to jack 88 remains the same, an electrical path is completed over which traffic can be carried between the two foreign subscribers' stations. In this manner, any two foreign subscribers' station serviced by the terminal station can be connected together to permit the communication of traffic therebetween. Whether the switching system of the invention be manually operated, as shown in Figs. 1*a* and 1*b*, or automatically operated, as shown in Fig. 2, a switching system of simple construction and operation is provided by means of which connections can be established quickly and efficiently for communication purposes between the subscribers' stations serviced by the terminal telegraph station of a telegraph communication system.

Having described the invention, we claim:

1. A telegraph communication system comprising, in combination, a terminal telegraph station and first and second subscribers' stations serviced by said terminal station, first and second operating positions located at said terminal station, means for connecting said first subscriber's station to said first position, means for connecting said second subscriber's station to said second position, each of said positions normally arranged to be responsive to a current flow therethrough in the same direction, control means at said terminal station for arranging said first position to be responsive to a flow of current in a direction opposite to that to which said first position is normally responsive, and a switching means at said terminal station for completing an operable circuit between said first and said second subscribers' stations including said connecting means between said first subscriber's station and said first position and between said second subscriber's station and said second position, the operation of said control and switching means enabling a flow of current between said first and said second positions over said operable circuit.

2. A telegraph communication system as stated in claim 1 wherein said connecting means between said first subscriber's station and said first position and between said second subscriber's station and said second position include separate radio frequency transmission systems.

3. A telegraph communication system as stated in claim 1 wherein each of said positions includes a hybrid circuit, said hybrid circuit including a plurality of polar relays, said connecting means between said first subscriber's station and said first position and between said second subscriber's station and said second position including separate radio frequency transmission systems.

4. A telegraph communication system comprising, in combination, a terminal telegraph station and first, second and third remotely located subscribers' stations serviced by said terminal station, means for connecting said first subscriber's station to said terminal station, said first subscriber's station arranged to be responsive to the flow of current therethrough in a given direction, first and second operating positions located at said terminal station, means for connecting said second subscriber's station to said first position, means for connecting said third subscriber's station to said second position, each of said positions normally arranged to be responsive to a current flow therethrough in the same direction, switching means at said terminal station for completing a first operable circuit between said first and said second subscribers' stations including said connecting means between said first subscriber's station and said terminal station and between said first position and said second subscriber's station, said switching means also being operated to complete in an alternative to the completion of said first operable circuit a second operable circuit between said first and said third subscribers' stations including said connecting means between said first subscriber's station and said terminal station and between said second position and said third subscriber's station, the direction of current flow through each of said positions being such as to produce a current flow in the same direction through said first subscriber's station, control means at said terminal station for arranging said first position to be responsive to a flow of current in a direction opposite to that to which said first position is normally responsive, and a second switching means at said terminal station for completing a third operable circuit between said second and said third subscribers' stations including said connecting means between said second subscriber's station and said first position and between said third subscriber's station and said second position, the operation of said control and second switching means enabling a flow of current between said first and said second positions over said third operable circuit.

5. A telegraph communication system comprising, in combination, a terminal telegraph station and first, second and third remotely located subscribers' stations serviced by said terminal station, means for connecting said first subscriber's station to said terminal station, said first subscriber's station arranged to be responsive to the flow of current therethrough in a given direction, first and second operating positions located at said terminal station, means for connecting said second subscriber's station to said first position, means for connecting said third subscriber's station to said second position, each of said positions normally arranged to be responsive to a current flow therethrough in the same direction, switching means at said terminal station for completing a first operable circuit between said first and said second subscribers' stations including said connecting means between said first subscriber's station and said terminal station and between said first position and said second subscriber's station, said switching means also being operated to complete in an alternative to the completion of said first operable circuit a second operable circuit between said first and said third subscribers' stations including said connecting means between said first subscriber's station and said terminal station and between said second position and said third subscriber's station, the direction of current flow through each of said positions being such as to produce a current flow in the same direction through said first subscriber's station, a manually operated switch included in the operating circuit of said first position, said first position being arranged by the operation of said switch to be responsive to a flow of current in a direction opposite to that to which said first position is normally responsive, and a second switching means at said terminal station for completing a third operable circuit between said second and said third subscribers' stations including said connecting means between said second subscriber's station and said first position and between said third subscriber's station and said second position, the operation of said switch and said second switching means enabling a flow of current between said first and said second positions over said third operable circuit.

6. A telegraph communication system comprising, in combination, a terminal telegraph station and first, second and third remotely located subscribers' stations serviced by said terminal station, means for connecting said first subscriber's station to said terminal station, said first subscriber's station arranged to be responsive to the flow of current therethrough in a given direction, first and second operating positions located at said terminal station, means for connecting said second subscriber's station to said first position, means for connecting said third subscriber's station to said second position, each of said positions normally arranged to be responsive to a current flow therethrough in the same direction, switching means at said terminal station for completing a first operable circuit between said first and said second subscriber's stations including said connecting means between said first subscriber's station and said terminal station and between said first position and said second subscriber's station, said switching means also being operated to complete in an alternative to the completion of said first operable circuit a second operable circuit between said first and said third subscriber's stations including said connecting means between said first subscriber's station and said terminal station and between said second position and said third subscriber's station, the direction of current flow through each of said positions being such as to produce a current flow in the same direction through said first subscriber's station, a control device included in the operating circuit of said first position, said first position being arranged by the operation of said device to be responsive to a flow of current in a direction opposite to that to which said first position is normally responsive, and a second switching means at said terminal station for completing a third operable circuit between said second and said third subscribers' stations including said connecting means between said second subscriber's station and said first position and between said third subscriber's station and said second position, the operation of said device and said second switching means enabling a flow of current between said first and said second positions over said third operable circuit, said first and said second switching means being arranged in a manner preventing the operation of one of said switching means during the operation of the other of said switching means.

7. A telegraph communication system comprising, in combination, a terminal telegraph station and first, second and third remotely located subscribers' stations serviced by said terminal station, a switchboard including first, second and third jacks located at said terminal station, means for connecting said first subscriber's station to said first jack, means for connecting said second jack to said third jack tip-to-tip, said first subscriber's station arranged to be responsive to the flow of current therethrough in a given direction, first and second operating positions located at said terminal station, means for connecting said second subscriber's station to said first position, means for connecting said third subscriber's station to said second position, each of said positions normally arranged to be responsive to a current flow therethrough in the same direction, a first connecting cord circuit at said terminal station for completing a first operable circuit between said first and second subscribers' stations including said connecting means between said first subscriber's station and said first jack and between said first position and said second subscriber's station, a second connecting cord circuit at said terminal station for completing in an alternative to the completion of said first operable circuit a second operable circuit between said first and said third subscribers' stations including said connecting means between said first subscriber's station and said first jack and between said second position and said third subscriber's station, the direction of current flow through each of said positions being such as to produce a current flow in the same direction through said first subscriber's station, control means at said terminal station for arranging said first position to be responsive to a flow of current in a direction opposite to that to which said first position is normally responsive, said first and said second connecting cord circuits being arranged to be operated to complete a third operable circuit between said second and said third subscribers' stations through said second and said third jacks and including said connecting means between said second subscriber's station and said first position and between said third subscriber's station and said second position, the operation of said connecting cord circuits to complete said third operable circuit and of said control means enabling a flow of current between said first and said second positions over said third operable circuit.

8. A telegraph communication system comprising, in combination, a terminal telegraph station and first, second and third remotely located subscribers' stations serviced by said terminal station, a switchboard including first, second and third jacks located at said terminal station, means for connecting said first subscriber's station to said first jack, means for connecting said second jack to said third jack tip-to-tip, said first subscriber's station arranged to be responsive to the flow of current therethrough in a given direction, first and second operating positions located at said terminal station, means for connecting said second subscriber's station to said first position, means for connecting said third subscriber's station to said second position, each of said positions normally arranged to be responsive to a current flow therethrough in the same direction, a first connecting cord circuit at said terminal station for completing a first operable circuit between said first and said second subscribers' stations including said connecting means between said first subscriber's station and said first jack and between said first position and said second subscriber's station, a second connecting cord circuit at said terminal station for completing in an alternative to the completion of said first operable circuit a second operable circuit between said first and said third subscribers' stations including said connecting means between said first subscriber's station and said first jack and between said second position and said third subscriber's station, the direction of current flow through each of said positions being such as to produce a current flow in the same direction through said first subscriber's station, a manually operated switch included in the operating circuit of said first position, said first position being arranged by the operation of said switch to be responsive to a flow of current in a direction opposite to that to which said first position is normally responsive, said first and said second connecting cord circuits being arranged to be operated to complete a third operable circuit between said second and said third subscribers' stations through said second and said third jacks and including said connecting means between said second subscriber's station and said first position and between said third subscriber's station and said second position, the operation of said connecting cord circuits to complete said third operable circuit and of said switch enabling a flow of current between said first and said second positions over said third operable circuit.

9. A telegraph communication system comprising, in combination, a terminal telegraph station and first, second and third remotely located subscribers' stations serviced by said terminal station, a switchboard including first, second and third jacks located at said terminal station, means for connecting said first subscriber's station to said first jack, means for connecting said second jack to said third jack tip-to-tip, said first subscriber's station arranged to be responsive to the flow of current therethrough in a given direction, first and second operating positions located at said terminal station, means for connecting said second subscriber's station to said first position, means for connecting said third subscriber's station to said second position, each of said positions normally arranged to be responsive to a current flow therethrough in the same direction, a first connecting cord circuit at said terminal station for completing a first operable circuit between said first and said second subscribers' stations including said connecting means between said first subscriber's station and said first jack and between said first position and said second subscriber's station, a second connecting cord circuit at said terminal station for completing in an alternative to the completion of said first operable circuit a second operable circuit between said first and said third subscribers' stations including said connecting means between said first subscriber's station and said first jack and between said second position and said third subscriber's station, the direction of current flow through each of said positions being such as to produce a current flow in the same direction through said first subscriber's station, a control device included in the operating circuit of said first position, said first position being arranged by the operation of said device to be responsive to a flow of current in a direction opposite to that to which said first position is normally responsive, said first and said second connecting cord circuits arranged to be operated to complete a third operable circuit between said second and said third subscribers' stations through said second and said third jacks and including said connecting means between said second subscriber's station and said first position and between said third subscriber's station and said second position, the operation of said connecting cord circuits to complete said third operable circuit and of said device enabling a flow of current between said first and said second positions over said third operable circuit, said first and said second connecting cord circuits being arranged in a manner permitting the completion of only one of said operable circuits at a time.

10. A telegraph communication system comprising, in combination, a terminal telegraph station and first and second subscribers' stations serviced by said terminal station, first and second operating positions located at said terminal station, means for connecting said first subscriber's station to said first position, means for connecting said second subscriber's station to said second position, each of said positions normally arranged to be responsive to a current flow therethrough in the same direction, control means at said terminal station for arranging said first position to be responsive to a flow of current in a direction opposite to that to which said first position is normally responsive, a switching means at said terminal station for completing an operable circuit between said first and said second subscribers' stations including said connecting means between said first subscriber's station and said first position and between said second subscriber's station and said second position, and means for automatically operating said control means in response to the operation of said switching means enabling a flow of current between said first and said second positions over said operable circuit.

11. A telegraph communication system comprising, in combination, a terminal telegraph station and first, second and third subscribers' stations serviced by said terminal station, means for connecting said first subscriber's station to said terminal station, said first subscriber's station arranged to be responsive to the flow of current therethrough in a given direction, first and second operating positions located at said terminal station, means for connecting said second subscriber's station to said first position, means for connecting said third subscriber's station to said second position, each of said positions normally arranged to be responsive to a curret flow therethrough in the same direction, switching means at said terminal station for completing a first operable circuit between said first and said second subscribers' stations including said connecting means between said first subscriber's station and said terminal station and between said first position and said second subscriber's station, said switching means also being operated to complete in an alternative to the completion of said first operable circuit a second operable circuit between said first and said third subscribers' stations including said connecting means between said first subscriber's station and said terminal station and between said second position and said third subscriber's station, the direction of current flow through each of said positions being such as to produce a current flow in the same direction through said first subscriber's station, a control means at said terminal station for arranging said first position to be responsive to a flow of current in a direction opposite to that to which said first position is normally responsive, a second switching means for completing a third operable circuit between said second and said third subscribers' stations including said connecting means between said second subscriber's station and said first position and between said third subscriber's station and said second position, and means for automatically operating said control means in response to the operation of said second switching means enabling a flow of current between said first and said second positions over said third operable circuit.

12. A telegraph communication system comprising, in combination, a terminal telegraph station and first, second and third remotely located subscribers' stations serviced by said terminal station, a switchboard including first, second and third jacks located at said terminal station, means for connecting said first subscriber's station to said first jack, means for connecting said second jack to said third jack tip-to-tip, said first subscriber's station arranged to be responsive to the flow of current therethrough in a given direction, first and second operating positions located at said terminal station, means for connecting said second subscriber's station to said first position, means for connecting said third subscriber's station to said second position, each of said positions normally arranged to be responsive to a current flow therethrough in the same direction, a first connecting cord circuit at said terminal station for completing a first operable circuit between said first and said second subscribers' stations including said connecting means between said first subscriber's station and said first jack and between said first position and said second subscriber's station, a second connecting cord circuit at said terminal station for completing in an alternative to the completion of said first operable circuit a second operable circuit between said first and said third subscribers' stations including said connecting means between said first subscriber's station and said first jack and between said second position and said third subscriber's station, the direction of current flow through each of said positions being such as to produce a current flow in the same direction through said first subscriber's station, control means including a plurality of polar relays at said terminal station for arranging said first position to be responsive to a flow of current in a direction opposite to that to which said first position is normally responsive, said first and said second connecting cord circuits arranged to be operated to complete a third operable circuit between said second and said third subscribers' stations through said second and said third jacks and including said connecting means between said second subscriber's station and said first position and between said third subscriber's station and said second position, and means for automatically operating said control means in response to the completion of said third operable circuit by the operation of said first and said second connecting cord circuits enabling a flow of current between said first and said second positions over said third operable circuit, said first and said second connecting cord circuits being arranged in a manner permitting the completion of only one of said operable circuits at a time.

No references cited.